(12) United States Patent
Nonomura et al.

(10) Patent No.: US 6,584,962 B2
(45) Date of Patent: Jul. 1, 2003

(54) ENGINE CONTROL, APPARATUS FOR A MULTICYLINDER ENGINE

(75) Inventors: Shigeyuki Nonomura, Hitachinaka (JP); Masami Nagano, Hitachinaka (JP); Minoru Ohsuga, Hitachinaka (JP); Toshiharu Nogi, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/775,816

(22) Filed: Feb. 5, 2001

(65) Prior Publication Data

US 2001/0011536 A1 Aug. 9, 2001

(30) Foreign Application Priority Data

Feb. 4, 2000 (JP) .......................... 2000-028046

(51) Int. Cl.[7] .............................................. F02D 41/06
(52) U.S. Cl. ...................................... 123/491; 123/673
(58) Field of Search ................................ 123/308, 491, 123/90.15, 673, 179.16

(56) References Cited

U.S. PATENT DOCUMENTS 5,497,752 A * 3/1996 Sagisaka et al. ............. 123/491
5,690,073 A * 11/1997 Fuwa ........................... 123/491
5,735,249 A * 4/1998 Parke et al. .................. 123/491
5,870,986 A * 2/1999 Ichinose ....................... 123/491
5,979,413 A * 11/1999 Ohnuma et al. ............. 123/491
5,983,868 A * 11/1999 Ichinose ................... 123/179.16
6,006,727 A * 12/1999 Katashiba et al. ........... 123/491
6,109,242 A * 8/2000 Katashiba et al. ........... 123/673
6,230,687 B1 * 5/2001 Marca ........................... 123/491
6,273,068 B1 * 8/2001 Joos et al. .................... 123/491

FOREIGN PATENT DOCUMENTS

| JP | 5-33699 | 2/1993 |
| JP | 9-250380 | 9/1997 |
| JP | 10-54271 | 2/1998 |
| JP | 10-103128 | 4/1998 |

* cited by examiner

*Primary Examiner*—Erick Solis
(74) *Attorney, Agent, or Firm*—Crowell & Moring LLP

(57) ABSTRACT

In an engine control apparatus for a multicylinder engine including an injection pulse width-setting unit for setting an injection pulse width for an injection valve situated in each cylinder based on signals output from an engine operational condition-detection system situated in a vehicle; the injection pulse width-setting unit includes an engine starting injection pulse-setting unit for setting an injection pulse width for each cylinder in the engine starting operation, and the engine starting injection pulse-setting unit includes an injection pulse width-correction unit for determining a correction coefficient to a basic injection pulse width, for each cylinder at each cycle.

9 Claims, 10 Drawing Sheets

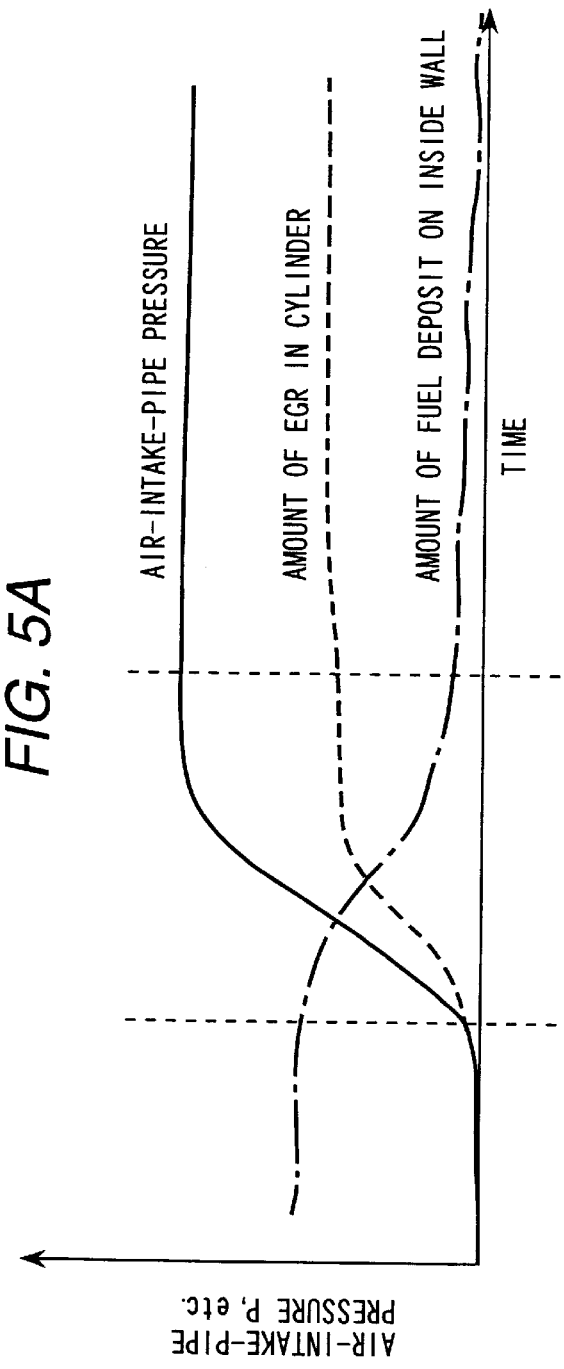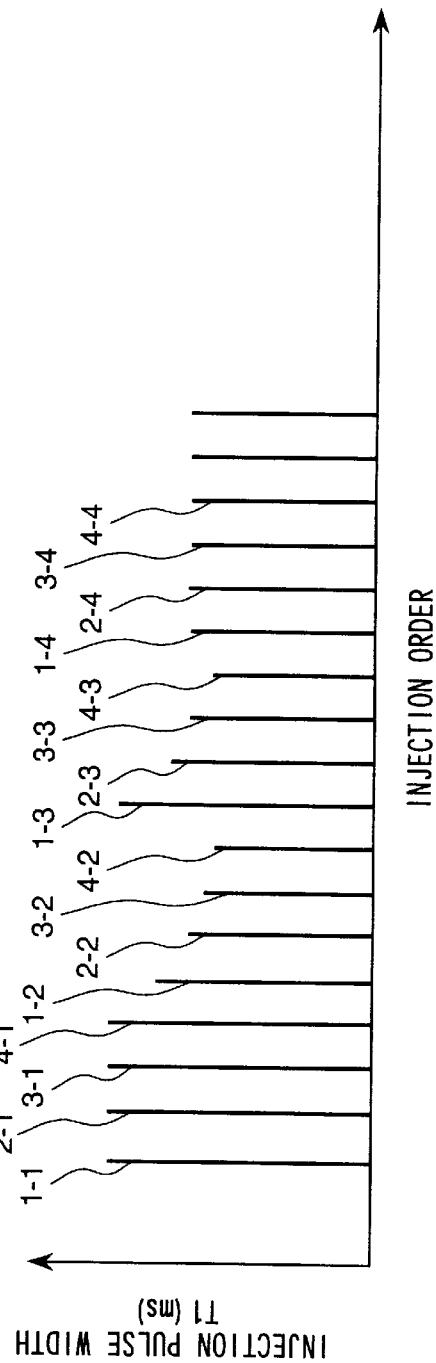

ΔP = P2−P1

ΔNe = Ne2−Ne1

FIG. 8A PRIOR ART  (AT THE FIRST CYCLE)
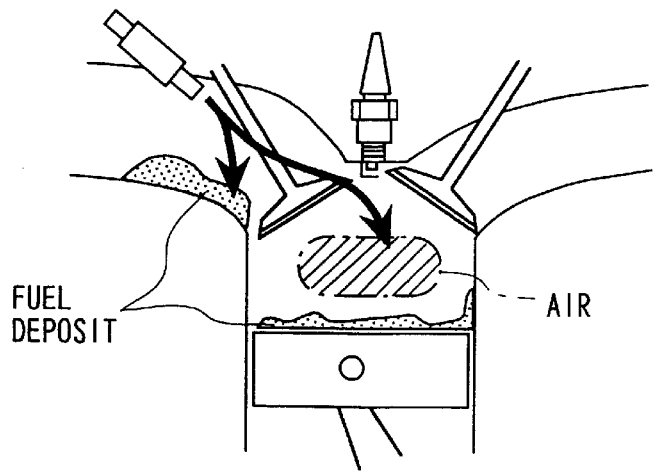
DELAY OF FUEL INFLOW
DUE TO FUEL DEPOSIT AT
ENGINE START
⬇
INCREASE OF FED FUEL
FIG. 8B PRIOR ART  (AT THE SECOND CYCLE)
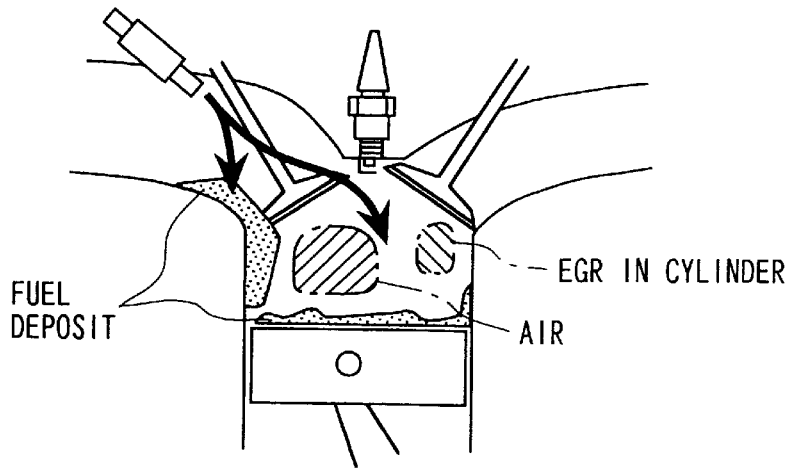
- DECREASE OF FRESH AIR DUE TO
  EGR IN CYLINDER
- INFLOW OF FUEL DEPOSIT
⬇
ENRICHMENT OF A/F

ENGINE CONTROL, APPARATUS FOR A MULTICYLINDER ENGINE

BACKGROUND OF THE INVENTION

The present invention relates to an engine control apparatus, and especially to an engine control apparatus for a multicylinder engine, which controls the amount of fuel injected into the engine by correcting the fuel amount injected from fuel injection valves into respective cylinders at the engine start.

In the present day in which environmental protection is required, it has been desired that low-pollution cars are positively generalized. Environmental protection has been required worldwide for exhaust gas regulations such as Low Emission Vehicle plan (Post 53 regulation) in Japan, Ultra Low Emission Vehicle Plan (ULEV) and Zero Emission Vehicle plan (ZEV) in U.S.A., Phase 3, 4 plan, and so forth. In order to correspond with such exhaust gas regulations, improvements in whole fuel-burning are required. To achieve these improvements, it is necessary to reduce the quantity of variation among air to fuel ratios in respective cylinders, and further to improve a pattern of a fuel-air mixture in each cylinder.

Recently, a fuel-injection method in which multi-point injection (MPI) is performed, has been adopted. This fuel-injection method injects fuel into each cylinder with a fuel injection valve independently, and it is mentioned that this method can improve engine performance such as fuel consumption, torque generation, operability, etc.

However, this method injects starting fuel into all cylinders at engine start in order to cause the first combustion early, and then performs a sequential injection to respective cylinders in order, after determining the top dead point of a reference cylinder, which in turn expels an unburned part of the first injected fuel from the car, and consequently causes a deterioration in performance of gas-exhaust. In order to solve the above problem, various fuel-injection methods or apparatuses are disclosed in Japanese Patent Application Laid-Open Hei 5-33699, Japanese Patent Application Laid-Open Hei 9-250380, Japanese Patent Application Laid-Open Hei 10-103128, etc.

Here, behaviors of fuel and air at the first and second cycles at the engine start are shown in FIG. 8A and FIG. 8B. In fuel injected from an injection valve of each cylinder in the first cycle, there is a part of the fuel injected into the cylinder, and another part of the fuel deposit remains on the inside wall of the air-intake pipe, as shown in FIG. 8A. Further, in the second cycle, since fuel injected from the injection valve is fed into the cylinder along with the remaining fuel deposit, the amount of fuel injected into the cylinder is larger than that of the fuel injected from the injection valve as shown in FIG. 8B.

Further, in each cylinder in the second cycle, EGR in a cylinder, in which the exhaust gas in the first cycle is recirculated in the cylinder, occurs due to misadjustment in the opening/closing timing of air-intake valves and gas-exhaust valves as shown in FIG. 8B, and this decreases the amount of fresh air to be fed into the cylinder in the. second cycle. Accordingly, in the second cycle, the ratio of air to fuel (hereafter referred to as A/F) around a plug of the cylinder is enriched due to the decrease of fresh air, which is caused by the EGR in a cylinder, and the increase of fuel fed. into the cylinder, which is caused. by the fuel deposit on the inside wall of the air-intake pipe, and this causes incomplete combustion. To solve this problem, a technique for a fuel injection-control apparatus, in which the amount of fuel to be injected from an injection valve in the second cycle is set as a value different from that of the fuel to be injected from an injection valve in the first cycle, is disclosed, for example, in Japanese Patent Application Laid-Open Hei 10-54271.

In this technique, the amount of fuel fed into each cylinder is changed, by setting the target A/F in the cylinder separately in the first and second cycles so that, in the first cycle, the amount of fuel injected from an injector of the cylinder is set as a sum of; the amount of starting fuel deposit on the inside wall of an air-intake pipe, and that of fuel to be fed into the cylinder; and in the second cycle, this amount is set as a difference between; the amount of fuel to be fed into the cylinder, and that starting fuel deposit on the inside wall of an air-intake pipe.

Here, the A/F in a cylinder at the second cycle counted from the engine. start is richer than that at other cycles as shown in FIG. 9, and this is caused by the effects of the decrease in the amount of fresh air due to the EGR in a cylinder, and the increase in fed fuel due to fuel deposit on the inside surface of the air-intake pipe, etc., which has adhered to such a surface at the engine start. Furthermore, as shown in FIG. 10, the amount of fuel deposit on the inside surface of the air-intake pipe, and the amount of exhaust HC, both increase, particularly with regard to fuel fed into a cylinder at the second cycle in the engine start operation, as the atomized fuel particle size increases.

The problem of decrease in the amount of fresh air due to the EGR in a cylinder is solved by controlling an actuator of a variable valve-timing adjusting device (VVT) for changing a relative rotational angle between a crank axis and a cam axis so that the opening/closing timing of air-intake and gas-exhaust valves agrees with the target relative rotational angle corresponding to operational conditions of the engine.

Moreover, the problem of the increase in fed fuel due to fuel deposit, which has adhered to such a surface at the engine start, is solved to some extent by controlling an actuator of a swirl control valve (SCV) for generating swirl flow in each cylinder, and making the particle size of fuel injected from the injection valve small, as shown in FIG. 11.

Meanwhile ,in consideration of the increase in fed fuel due to the fuel deposit in each cylinder at the engine start, the operation state is different in each cylinder. For example, one cylinder is in an air-intake state, and another cylinder is in a gas-exhaust state. Further, even at the same cycle, the pressure values and so forth are different in the respective cylinders. Thus, Inventors have newly recognized that the problem of the fuel deposit at the engine start can be absolutely solved by changing a setting value for the fuel-injection amount of each cylinder in addition to a setting value for the fuel-injection amount in each cycle, and this can correspond with the requirement for environment protection enough. However, any conventional technique does not consider this point specifically.

SUMMARY OF THE INVENTION

The present invention has been achieved in consideration of the above-described problems, and is aimed at providing an engine control apparatus for a multicylinder engine, which is capable of implementing complete combustion of fuel in the engine starting operation while using a variable valve timing-adjustment mechanism and/or a swirl-control valve, by controlling the fuel injection amount of each cylinder in the starting operation of a engine in which a multi-point injection system is adopted.

To achieve the above objective, the present invention provides an engine control apparatus for a multicylinder engine including injection a pulse width-setting means for setting an injection pulse width for an injection valve situated in each cylinder based on signals output-from an engine operational condition-detection means situated in a vehicle; wherein the injection pulse width-setting means includes engine starting injection pulse-setting means. for setting an injection pulse width for each cylinder in the engine starting operation, and the engine starting injection pulse-setting means includes injection pulse width-correction means for determining a correction coefficient to a basic injection pulse width, for each cylinder at each cycle.

In accordance with the engine control apparatus of the present invention, such as that composed above, since the injection amount of the cylinders at each cycle and the injection amount of each cylinder at the cycle are determined, it is possible to approximate the air to fuel ratio to the stoichiometric ratio, which can absolutely correspond with the requirement for environment protection.

Further, in another preferable example of the above engine control apparatus, the injection pulse width-correction means determines a correction coefficient for each cylinder, to the basic injection pulse width, at the second cycle in the engine starting operation; and this means determines injection pulse widths for the respective cylinders so that the injection pulse widths decrease in injection order of the cylinders, at least at the second cycle in the engine starting operation.

Furthermore, in another preferable example of the above engine control apparatus, the injection pulse width-correction means determines an injection pulse width for each cylinder based on the pressure in an air-intake pipe at the first cycle, and a pressure difference between the pressure in the air-intake pipe at the previous cycle and that at the current cycle; or this means determines an injection pulse widths for each cylinder based on the engine rotational speed at the first cycle, and an engine rotational speed difference between the at the previous cycle and that at the current cycle.

Moreover, another preferable example of the above engine control apparatus, further including a variable valve timing-adjustment mechanism-driving means for changing the opening/closing timing of air-intake valves and gas-exhaust valves, which are situated at each cylinder, and/or a swirl-control valve-driving means for generating swirl flow in each cylinder.

In accordance with the engine control apparatus of the present invention, such as that composed above, it is possible to implement the complete combustion, particularly at the second cycle in the engine starting operation by the effects of the above injection amount-control for each cylinder, in which a basic injection pulse width is corrected by a correction coefficient for each cylinder, and the suppression of the EGR in a cylinder and the fuel deposit on the inside surface of an air-intake pipe, which are achieved by using a variable valve timing-adjustment mechanism and a swirl-control valve.

BRIEF DESCRIPTION OF THE DRAWINGS

FIG. 5A is a graph showing the operational characteristics of the engine in which an engine control apparatus of another embodiment according to the present invention is used.

FIG. 5B is a diagram illustrating the injection pulse widths and the injection order of the respective cylinders in each cycle.

FIG. 8A is an illustration showing behaviors of fuel, air, and EGR in a cylinder at the first cycle in the conventional MPI system.

FIG. 8B is an illustration showing behaviors of fuel, air, and EGR in a cylinder at the second cycle in the conventional MPI system.

DETAILED DESCRIPTION OF THE EMBODIMENTS

Figure 1:
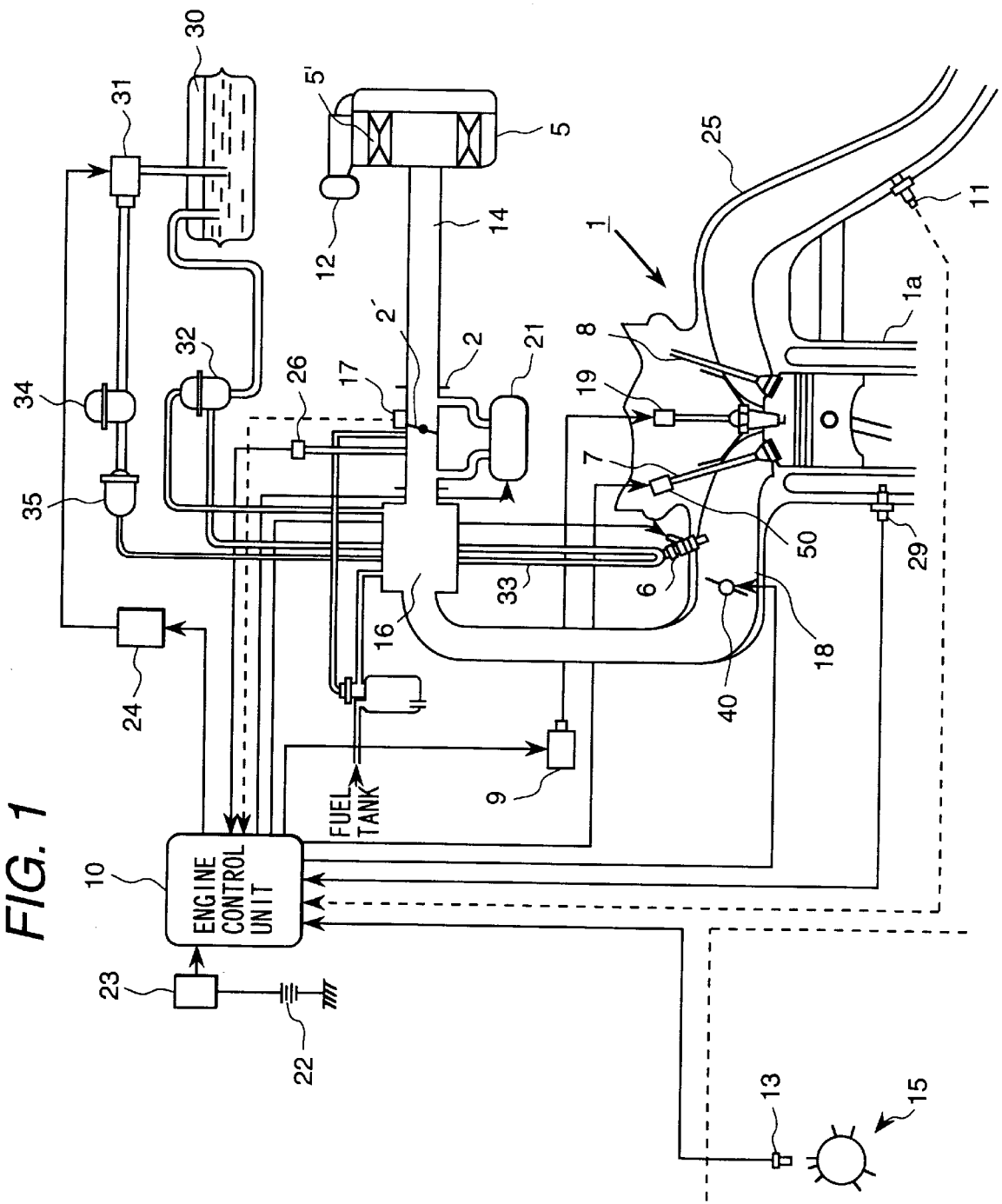
FIG. 1 is a diagram showing the whole composition of an engine control system of an embodiment according to the present invention.

Hereafter, the embodiments of the present invention will be explained in details with reference to the drawings. FIG. 1 shows the whole composition of an engine control system of an embodiment according to the present invention.

In FIG. 1, an air-intake pipe 18 and an gas-exhaust pipe 25, which are opened and close by air-intake valves 7, gas-exhaust valves 8, respectively, are connected each cylinder 1a of a four-cylinder engine 1. Further, the air-intake pipe 18 has two branch pipes, each of which has an air-intake port, and an air cleaner 5 is situated in the most upper stream of the air-intake pipe 18.

The air taken in from an inlet portion 12 of the air cleaner 5 passes through a duct 14 located downstream of a filter 5' of the air cleaner 5 and a throttle body 2 which includes a throttle valve 2' for adjusting the amount of intake-air, after passing through the filter 5'. Further, the air enters a collector 16. The collector 16 distributes the intake-air to the air-intake pipes of the respective cylinders 1a in the four-cylinder engine 1, and the air distributed to each air-intake pipe is fed to the cylinder 1a.

On one hand, the fuel is sucked from a fuel tank 30, and it is pressurized by a fuel pump 31. Further, the pressurized fuel passes through a fuel pipe 33 which includes a fuel damper 34 and a fuel filter 35, and is introduced to a fuel inlet of an injector 6. Then, the pressure of the fuel introduced to the injector 6 is controlled to be a constant pressure, and an extra amount of fuel is returned to the fuel tank 30.

The throttle body 2 is equipped with a pressure sensor 26 for detecting the pressure in the air-intake pipe, and a throttle sensor 17 for detecting the opening degree of the throttle valve 2'. Also, a crank angle sensor 13 for detecting a rotation angle of a plate 15, an $O_2$ sensor 11 for detecting the concentration of oxygen in exhaust gas, and a water temperature sensor 29 for detecting the temperature of coolant of the engine 1, are attached to the crank shaft (not shown in this figure), the gas-exhaust pipe 25, and a cylinder 1a, respectively.

Further, an intake-air amount signal output from the pressure sensor 26, and signals output from; the throttle sensor 17, the water temperature sensor 29, each crank angle sensor 13, and the $O_2$ sensor 11; are sent to an engine control unit 10.

The engine control unit 10 performs the predetermined calculational processes based on the signals indicating the engine operational state, which are sent from the above sensors, so as to implement the optimal engine-operations such as opening/closing an injection valve 6 for injecting fuel into each cylinder 1a, driving an ignition plug 19 by the turn-on/off of an ignition coil 9, opening/closing an ISC (Idling Speed Control) valve 21 for controlling the idling rotation-speed, etc. Moreover, the control unit 10 controls a relay 24 for switching the operation of the fuel pump 31, a swirl-control valve-driving means 40, and a valve timing-adjusting mechanism-driving means 50.

Figure 2:
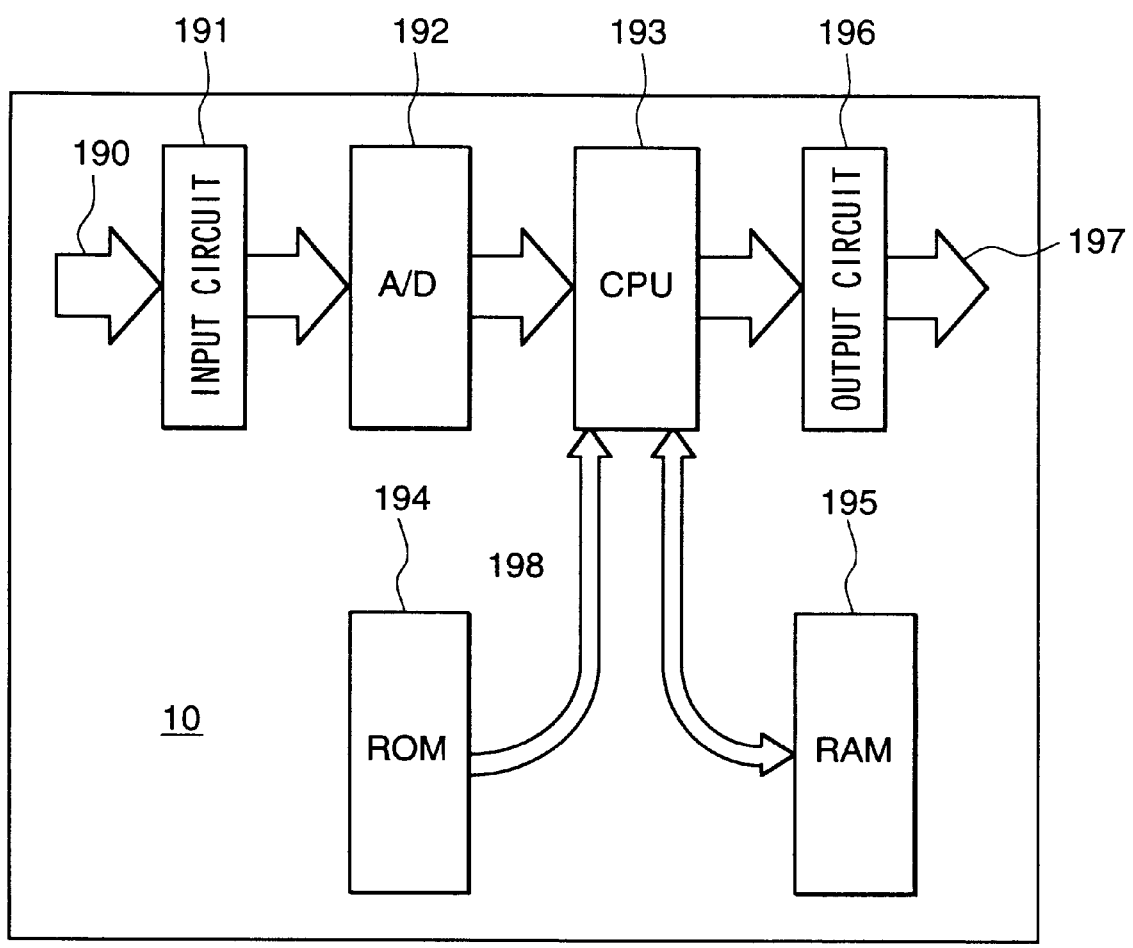
FIG. 2 is a schematic block diagram showing the internal composition of an engine control apparatus in the engine control system shown in FIG. 1.

FIG. 2 schematically shows the internal composition of the engine control unit 10, which includes; an input circuit 191 comprising an LSI circuit (I/OLSI) for inputting the signals 190 indicating the engine operational state sent from the-above sensors; an A/D converter 192; a central processing unit (CPU) 193; a rewritable nonvolatile memory (EP-ROM) 194; a random memory (RAM) 195 for temporarily storing results of calculation executed by the CPU 193, and A/D-conversion; and an output circuit 196 for outputting the control signals 197 which drive actuators of the above components or devices. Specifically, CPU 193 performs the predetermined processes by using EP-ROM 194 and RAM 195 based on the signals sent from the $O_2$ sensor 11, each crank angle sensor 13, a starter switch (not shown in FIG. 1), the pressure sensor 26, the water temperature sensor 29, a relay 23 of a battery 22, and the throttle sensor 17, etc., and this CPU 193 further controls each injection valve 6, each ignition plug 19, the relay 24 of the fuel pump 30, actuators of the swirl-control valve-driving means 40 and a valve timing-adjusting mechanism-driving means 50. Further, CPU 193 controls the sequential fuel-injecting operation from the engine start, in which fuel is injected into the respective cylinders in turn corresponding to the timing of air-intake and injection processes in each cylinder 1a.

The swirl-control valve-driving means 40 opens and closes the swirl-control valve (SCV) (not shown in FIG. 1) for progressing swirl flow in each cylinder 1a, and is located upstream of each injection valve 6. Further, the flow-path area of the air-intake pipe 18 is narrowed by driving this SCV in the closing direction, and this increases the speed of air flow passing through the air-intake pipe 18, which in turn reduces the amount of the fuel deposit on the inside wall of the pipe 18. Furthermore, a lateral-direction flow (swirl flow) is generated by passing the intake-air through only one of the two air-intake ports provided for each cylinder 1, and the swirl flow is adjusted so as to be lifted near to the ignition plug 19 in the compression process of the cylinder 1a.

The valve timing-adjusting mechanism-driving means 50 adjusts the opening/closing timing of the air-intake valves 7 and the gas-exhaust valves 8 of each cylinder 1a so that a relative rotational angle between the crank shaft for converting the reciprocating motion of each piston to the rotational motion, and the cam shaft (not shown in FIG. 1) for transferring the rotational motion to the air-intake valves 7 and the gas-exhaust valves 8, agrees with the target relative angle corresponding to the engine operational state, by changing the relative rotational angle. By the above adjustment of the opening/closing timing of the air-intake valves 7 and the gas-exhaust valves 8, the EGR in a cylinder is prevented, which in turn prevents fresh. air to be fed into each cylinder 1a from decreasing.

Here, the engine control unit 10 of the embodiments according to. the present invention comprises an engine operational state-detection means for taking in signals sent from the pressure sensor 26, each crank angle sensor 13, the throttle sensor 17, the water temperature sensor 29, $O_2$ sensor 11, etc., an injection pulse width-setting means for setting an injection pulse width based on signals sent from the engine operational state-detection means, an injection amount-calculation means for calculating the amount of fuel injected from each injection valve 6 based on a signal sent from the injection pulse width-setting means, an injection timing-calculation means for calculating the timing of injection in each cylinder 1a, and an injection valve-driving means for driving each injection valve 6 based on the signals sent from the injection amount-calculation means and the injection timing-calculation means.

The injection pulse width-setting means includes an engine starting injection pulse-setting means for determining a target value to control the amount of fuel in each cylinder 1a at each cycle in the engine starting operation (the operation during a time in which the engine rotational speed reaches a predetermined speed, or in which the starter switch is turned on), an ordinary operation injection pulse-setting means for setting an injection pulse width for each cylinder 1a at the period other than the idling operation. Further, the engine starting injection pulse-setting means also includes an injection pulse width-correction means for correcting a basic injection pulse width set based on the injection amount determined by injection amount-calculation means. An injection pulse width EGIM in the engine starting operation for each cycle is obtained by the engine starting injection pulse-setting means, using the following equation (1).

$$EGIM = EGIS \times Kn \times Kst \times Kf \qquad (1),$$

where EGIS is a basic injection pulse width which is determined corresponding to the water temperature of the engine 1, Kn is a correction coefficient to the engine rotational speed, Kst is a correction coefficient to the time elapsed from the engine start, and Kf is a correction coefficient to the amount of fuel injection.

Figure 3A:
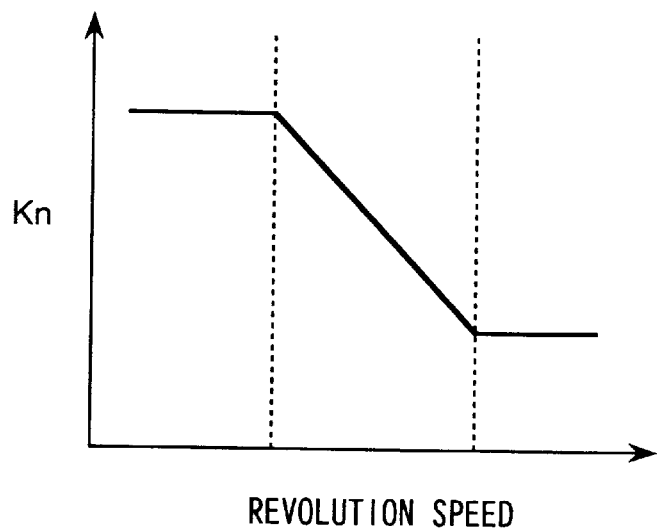
FIG. 3A is a graph showing the relationship between a correction coefficient Kn to the revolution speed, and revolution speed of an engine.
Figure 3B:
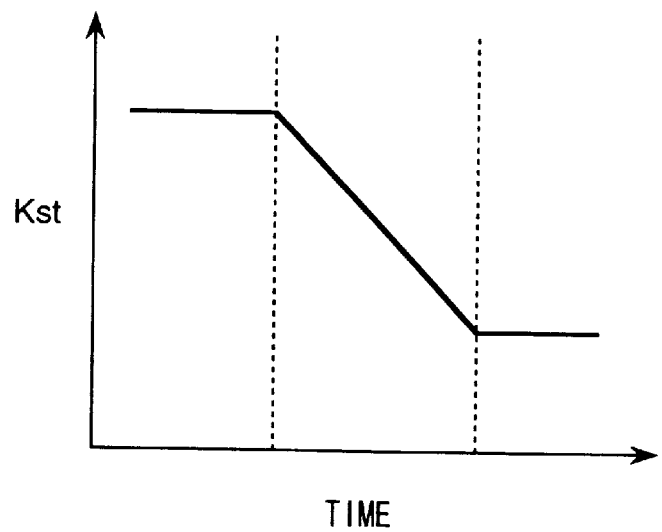
FIG. 3B is a graph showing the relationship between a correction coefficient Kst to engine starting time, and the elapsed time from the engine start.

The injection pulse width-correction means in the engine starting injection pulse-setting means also determines the correction coefficient Kn, the correction coefficient Kst, and the correction coefficient Kf. Here, the correction coefficient Kn is determined so that the pulse width EGIS decreases as the engine rotational speed increases as shown in FIG. 3A, and the correction coefficient is determined so that the pulse width EGIS decreases as time is elapsed as shown in FIG. 3B.

Figures 4A, 4B:
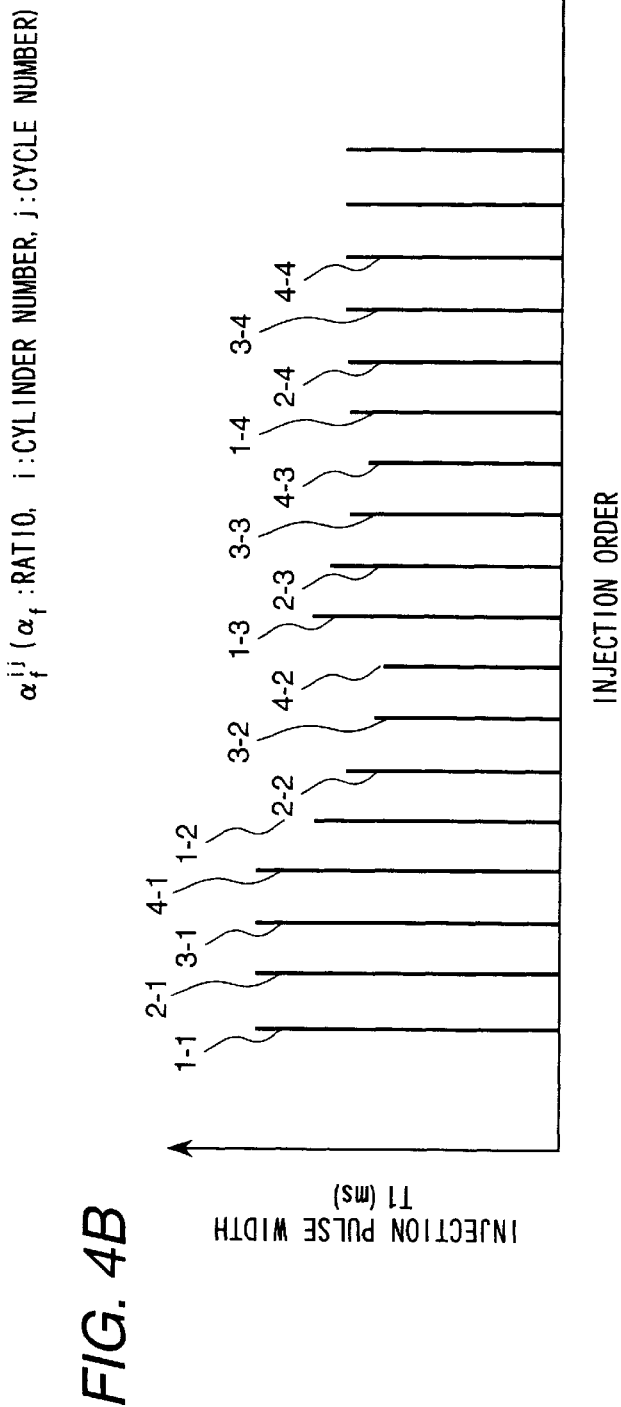
FIG. 4A is a map of the correction coefficients Kf to the injection amount, used by an injection pulse width-correction means in the engine control apparatus shown in FIG. 2.
FIG. 4B is a diagram illustrating the injection pulse widths and the injection order of the respective cylinders in each cycle.

FIGS. 4A and 4B show how the correction coefficient Kf is determined, and an example of results of the determining of the correction coefficient Kf, which are performed by the engine control unit 10 of this embodiment, respectively.

First, in FIG. 4B showing the injection pulse widths Ti and the injection order in the respective cylinders in each cycle, the reference number attached to each injection pulse indicates the injection order of the corresponding cylinder 1a and the cycle number. For example, the reference number (1–2) indicates the number (No. 1) of the cylinder into which fuel is first injected at the second cycle.

As seen from FIG. 4B, the injection pulse width-correction means determines the injection pulse widths Ti at the first cycle so that all the widths Ti is equal. On the other hand, at the second cycle, the correction coefficient Kf to the basic injection pulse width is determined so that the widths Ti at the second cycle are smaller than those at the first cycle, and they are decreases in injection order of the respective cylinders 1a. Thus, the injection amount of each cylinder 1a is controlled based on the correction coefficient Kf for each cylinder 1a, determined by the engine starting injection pulse-setting means. In this embodiment, as shown in FIG. 4A, each correction coefficient Kf is determined by looking up a correction-coefficient map, stored in EP-ROM 194, describing correction ratios to the basic injection pulse width, for the respective injection order of the cylinders 1a at each cycle number, which are obtained in advance.

Further, in the same manner as the injection pulse widths Ti at the second cycle, the engine starting injection pulse-setting means determines the injection pulse widths Ti at the third cycle so that they are smaller than those at the first cycle, and decreases in injection order of the respective cylinders 1a. Furthermore, although the injection pulse widths Ti at the fourth cycle are set so that all the widths Ti are equal, the widths Ti are set to a smaller value than that at the first cycle because the amount of fuel deposit on the inside wall of the air-intake pipe, etc., is less than that at the first cycle.

Figure 6A:
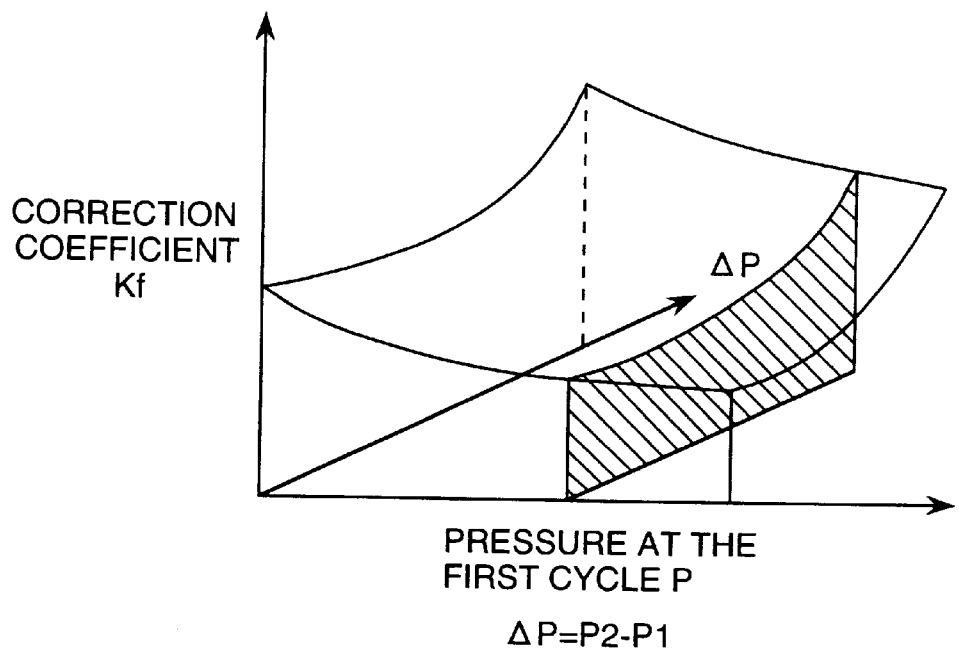
FIG. 6A is a diagram showing the correction coefficient Kf curved surface used by the injection pulse width-correction means which has determined the engine control shown in FIG. 5A and FIG. 5B.
Figure 6B:
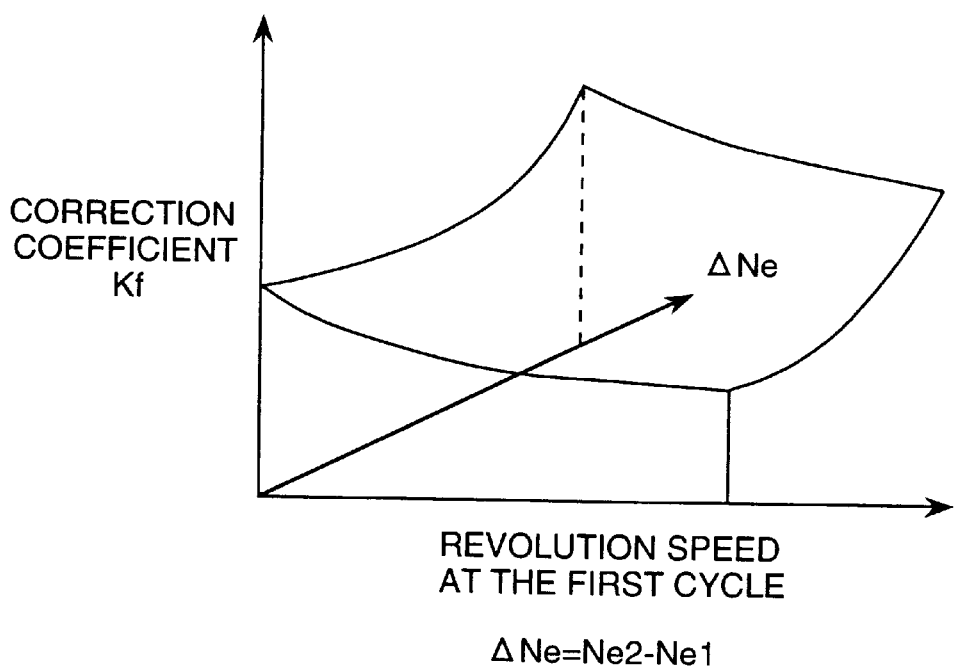
FIG. 6B is a diagram showing another example of the correction coefficient Kf curved surface used by the injection pulse width-correction means.

FIGS. 5A and 5B, and FIGS. 6A and 6B, show an example of results of the operation using the determined correction coefficients Kf, which are performed by the engine control unit 10, and how the correction coefficient Kf is determined, in another embodiment. FIG. 5A shows changes in the pressure in the air-intake pipe, the amount of EGR in a cylinder, and the amount of fuel deposit on the inside wall. Also, FIG. 5B shows the injection pulse widths Ti and the injection order of the respective cylinders 1a in each cycle. Further, FIGS. 6A and 6B, show examples of the Kf-determining method used by the engine control unit 10 of this embodiment.

In this embodiment, except for determination of Kf, which is performed by the injection pulse width-correction means, it is performed in the same manner as in the previous embodiment that the injection amount of each cylinder 1a is controlled based on the correction coefficient Kf for each cylinder 1a, which is determined by the engine starting injection pulse-setting means. Therefore, details of the determining of Kf, performed by the-injection pulse width-correction means, is explained bellow.

The correction coefficient Kf in this embodiment is determined by considering the characteristics such as that shown in FIG. 5A in which the EGR in a cylinder increases, and the amount of fuel deposit on the inside wall decreases, as the pressure in the air-intake pipe increases. Specifically, as shown in FIG. 6A, the correction coefficient Kf is determined based on the pressure in the air-intake pipe of each cylinder 1a at the first cycle in the engine starting operation, and the quantity ΔP of change in the pressure in the air-intake pipe of each cylinder 1a, in an interval between the previous and current cycles.

The above Kf-determination method is created by considering that since each cylinder 1a is in one of air-intake process, compression process, explosion process, and gas-exhaust process, in one cycle, and the respective cylinders 1a are thus in different operational states at the same cycle, the pressure values in the respective cylinders 1a are different in the same cycle. Therefore, in order to correspond with the recent requirement for environment protection absolutely, it is necessary to provide a different correction coefficient Kf for each cylinder 1a. Thus, a correction coefficient Kf for each cylinder 1a is determined by looking up a table describing the relationship between the correction coefficient Kf and a set of the pressure P in the air-intake pipe of the cylinder 1a, the pressure difference ΔP between the pressure Pi (i=1, 2, . . . ) at the previous cycle and that Pi+1 at the current cycle in the air-intake pipe of the cylinder 1a. By using a correction coefficient Kf determined for each cylinder 1a corresponding to its operational state, the injection amount of the cylinder 1a is controlled.

The respective embodiments having the above-described functions can achieve the following effects.

The engine control unit 10 of the first embodiments comprises the injection pulse width-setting means for setting each injection pulse width, in the starting operation or the ordinary operation of the engine, based on signals sent from the pressure sensor 26, each crank angle sensor 13, the throttle sensor 17, the water temperature sensor 29, the $O_2$ sensor 11, etc.; the injection amount-calculation means; the injection timing-calculation means which perform their functions based on signals sent from the injection pulse width-setting means; and the injection valve-driving means. Further, the engine starting injection pulse-setting means in the injection pulse width-setting means includes the injection pulse width-correction means which determines the injection pulse widths Ti at the first cycle so that all the widths Ti is equal, based on a signal sent from the pressure sensor 26 or each crank angle sensor 13 Furthermore, this means determines the respective correction a coefficients Kf at the second cycle so that the pulse widths Ti at the second cycle are smaller than those at the first cycle, and they decrease in injection order of the respective cylinders 1a. Moreover, the injection amount of each cylinder 1a in the engine starting operation is controlled at each cycle based on the correction coefficient Kf for the cylinder 1a, which is determined by the injection pulse width-correction means. Thus, in the engine starting operation, particularly at the second cycle, the A/F ratio around the ignition plug 19 of each cylinder can be approximated to the stoichiometric air to fuel ratio.

Also, in the engine control unit 10 of the second embodiment, since the correction coefficient Kf for each cylinder 1a is determined based on the pressure P in the air-intake pipe at the first cycle, and the amount ΔP of change in the pressure in the air-intake pipe between the previous and current cycles in the cylinder 1a, the injection amount of each cylinder 1a can be controlled by taking the operational state of the cylinder 1a into account. Thus, the A/F ratio around the ignition plug 19 of each cylinder can be more absolutely approximated to the stoichiometric air to fuel ratio.

Moreover, in the above embodiments, the decrease in fresh air due to the EGR in a cylinder is suppressed by the valve timing-adjusting mechanism-driving means 50, the increase of fuel fed into each cylinder 1a due to the fuel deposit on the inside wall of the air-intake pipe at the engine start is suppressed by the swirl-control valve-driving means 40 and the controlling of the injection amount of each cylinder 1a in the engine starting operation.

Figure 7:
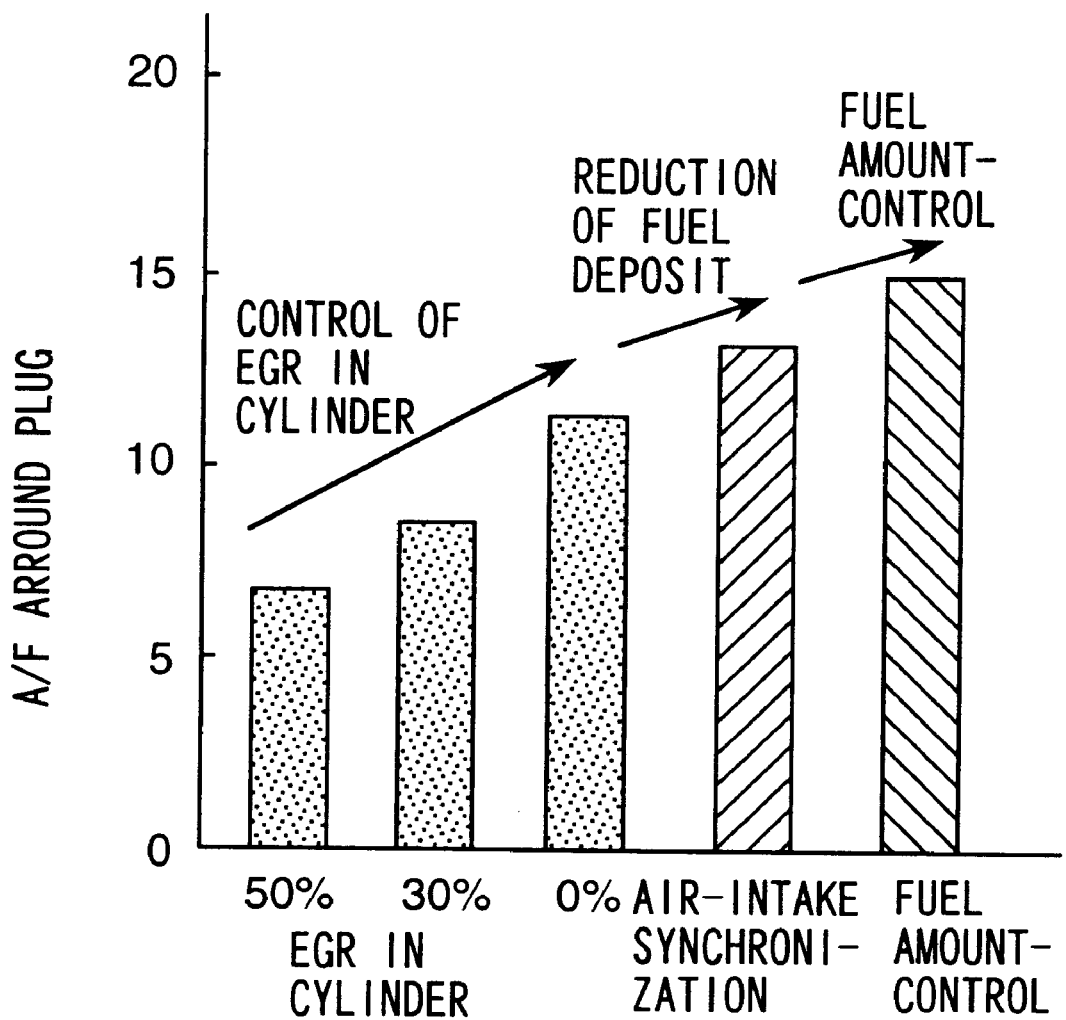
FIG. 7 is a bar graph showing the improvement of A/F ratio in each cylinder at the second cycle in the engine starting operation, achieved by countermeasures which are adopted in the engine control apparatus of the embodiments implementing the controls shown in FIGS. 5A and 5B, and FIGS. 6A and 6B.
Figure 9:
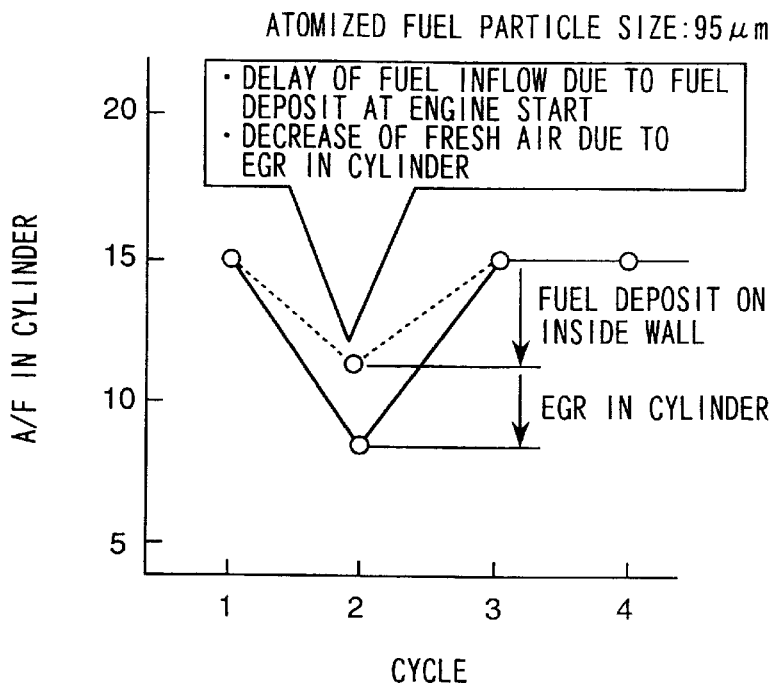
FIG. 9 is a graph showing the A/F ratio in the cylinder shown in FIGS. 8A and 8B with regard to the respective cycles.
Figure 10:
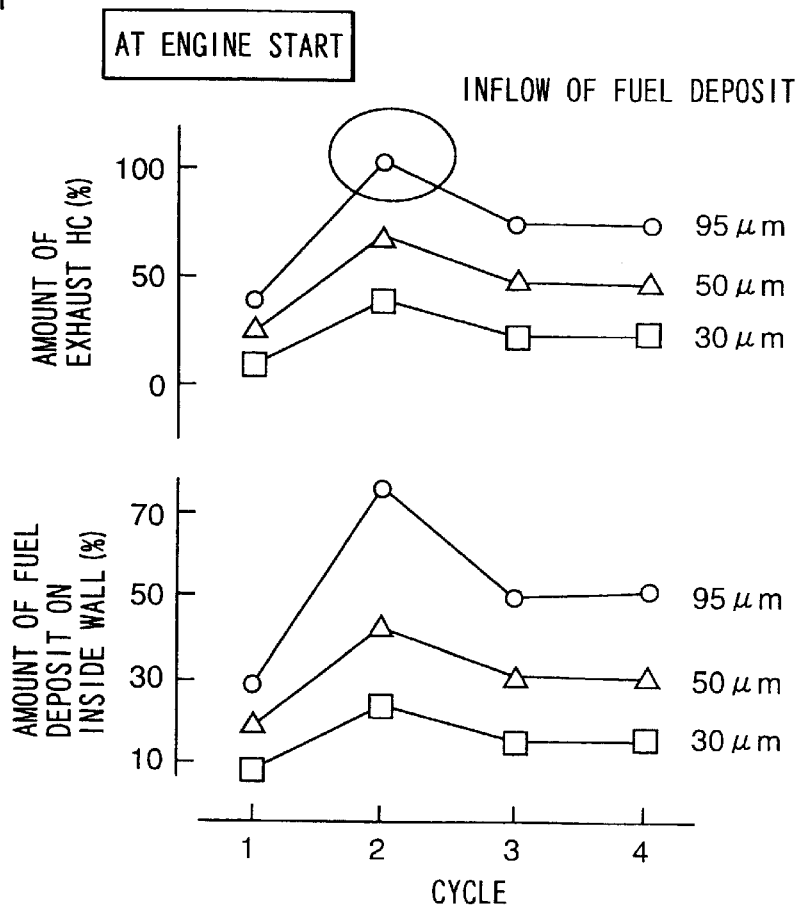
FIG. 10 is a graph showing the amount of fuel deposit on the inside surface of the air-intake pipe and the amount of exhaust HC in the cylinder shown in FIGS. 8A and 8B, with regard to the respective cycles.
Figure 11:
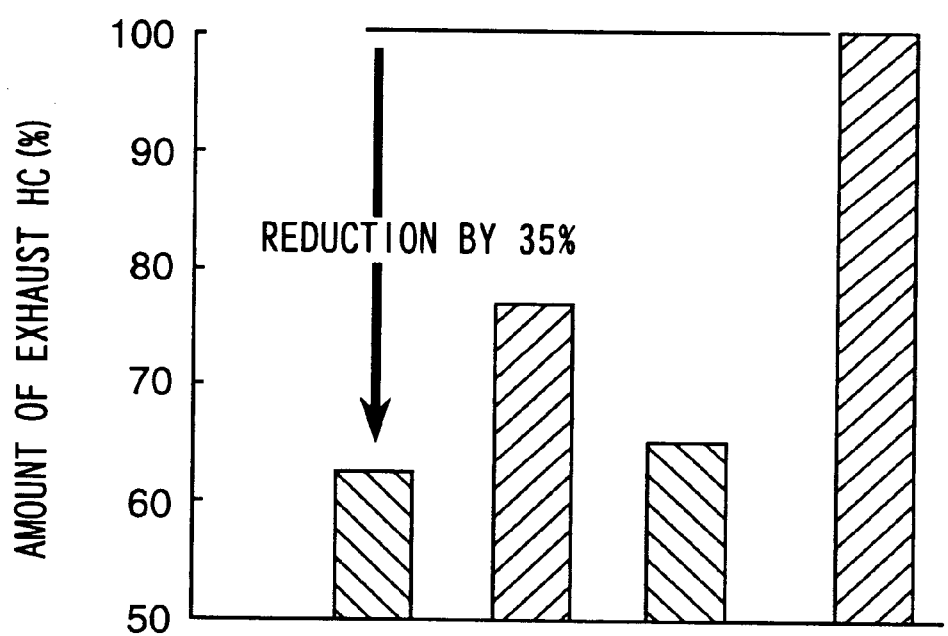
FIG. 11 shows how the problem of increasing fed fuel due to fuel deposit is solved by controlling actuator swirl and reducing injected fuel particle size.

Thus, as shown in FIG. 7, the above synergistic improvements can implement that the A/F ratio around the ignition plug 19 of each cylinder is almost equal to the stoichiometric air to fuel ratio (14.7).

Although only two embodiments are described above, the present invention is not restricted to these two embodiments, and the design of the engine control apparatus according to the present invention can be variously changed in the scopes of the described claims.

For example, although the correction coefficient Kf to the injection. amount of each cylinder 1a is determined by the injection pulse width-correction means based on the pressure P in the air-intake pipe at the first cycle, and the amount $\Delta p$ of change in the pressure in the air-intake pipe between the previous and current cycles in the cylinder 1a in the second embodiment, it is possible that this coefficient Kf is determined by looking up a table describing the relationship between correction coefficients Kf and a set of the engine rotational speed Ne, the engine rotational speed difference $\Delta Ne$ between the rotational speed Nei (i=1, 2, . . . ) at the previous cycle and that Nei+1 at the current cycle.

Thus, as described above, by using the engine control apparatus for a multicylinder engine, according to the. present invention, the air to fuel-ratio around an ignition plug of each cylinder can be approximated to the stoichiometric ratio by controlling the injection amount of the cylinder at each cycle.

Also, it is possible to correspond with the requirement for environment protection by implementing the complete combustion, particularly at the second cycle in the engine starting operation, by the effects of the above injection amount-control for each cylinder, and the suppression of the EGR in a cylinder and the fuel deposit on the inside surface of an air-intake pipe, which are achieved by using a variable valve timing-adjustment device and a swirl-control valve.

What is claimed is:

1. An engine control apparatus for a multicylinder engine including injection pulse width-setting means for setting an injection pulse width for an injection valve situated in each cylinder based on signals output from engine operational condition-detection means situated in a vehicle;

wherein said injection pulse width-setting means includes engine starting injection pulse-setting means for setting an injection pulse width for each cylinder in the engine starting operation, and said engine starting injection pulse-setting means includes injection pulse width-correction means for determining a correction coefficient to a basic injection pulse width, for each cylinder at each cycle, and wherein said injection pulse width-correction means determines a correction coefficient for each cylinder, to said basic injection pulse width, at the second cycle in the engine starting operation.

2. An engine control apparatus according to claim 1, wherein said injection pulse width-correction means determines injection pulse widths for said respective cylinders so that said injection pulse widths decrease in injection order of said cylinders, at least at the second cycle in the engine starting operation.

3. An engine control apparatus according to claim 1, further including variable valve timing-adjustment mechanism-driving means for changing the opening/closing timing of air-intake valves and gas-exhaust valves, which are situated at each cylinder.

4. An engine control apparatus according to claim 1, further including swirl-control valve-driving means for generating swirl flow in each cylinder.

5. An engine control apparatus according to claim 1, wherein said basic injection pulse width correction is based on a predetermined exhaust gas condition at the time of the starting of each cylinder with respect to the basic injection pulse width at each cycle.

6. An engine control apparatus for a multicylinder engine including injection pulse width-setting means for setting an injection pulse width for an injection valve situated in each cylinder based on signals output from engine operational condition-detection means situated in a vehicle;

wherein said injection pulse width-setting means includes engine starting injection pulse-setting means for setting an injection pulse width for each cylinder in the engine starting operation, wherein said injection pulse width-correction means determines a correction coefficient for each cylinder, to said basic injection pulse width, at the second cycle in the engine starting operation and as engine starting injection pulse setting means adjusts the injection pulse or an injection amount at each cylinder second cycle.

7. An engine control apparatus for a multicylinder engine including injection pulse width-setting means for setting an injection pulse width for an injection valve situated in each cylinder based on signals output from engine operational condition-detection means situated in a vehicle;

wherein said injection pulse width-setting means includes engine starting injection pulse-setting means for setting an injection pulse width for each cylinder in the engine starting operation, wherein said injection pulse width-correction means determines injection pulse widths for said respective cylinders based on a correction coefficient map which has been obtained in advance.

8. An engine control apparatus for a multicylinder engine including injection pulse width-setting means for setting an injection pulse width for an injection valve situated in each cylinder based on signals output from engine operational condition-detection means situated in a vehicle;

wherein said injection pulse width-setting means includes engine starting injection pulse-setting means for setting an injection pulse width for each cylinder in the engine starting operation, wherein said injection pulse width-correction means determines an injection pulse width for each cylinder based on the pressure in an air-intake pipe at the first cycle, and a pressure difference between the pressure in said air-intake pipe at the previous cycle and that at the current cycle.

9. An engine control apparatus for a multicylinder engine including injection pulse width-setting means for setting an injection pulse width for an injection valve situated in each cylinder based on signals output from engine operational condition-detection means situated in a vehicle;

wherein said injection pulse width-setting means includes engine starting injection pulse-setting means for setting an injection pulse width for each cylinder in the engine starting operation, wherein said injection pulse width-correction means determines an injection pulse widths for each cylinder based on the engine rotational speed at the first cycle, and an engine rotational speed difference between the at the previous cycle and that at the current cycle.

* * * * *